United States Patent
Laoufi et al.

(10) Patent No.: US 12,411,231 B2
(45) Date of Patent: Sep. 9, 2025

(54) VEHICLE RADAR SYSTEM FOR DETECTING PRECEDING OBJECTS

(71) Applicant: QUALCOMM AUTO LTD., Cambridge (GB)

(72) Inventors: Moroine Laoufi, Courbevoie (FR); Florian Trompeter, Hammelburg (DE); Christian Schwert, Hassfurt (DE); Jeremy Bernard, Paris (FR)

(73) Assignee: Qualcomm Auto Ltd., San Diego, CA (US)

( * ) Notice: Subject to any disclaimer, the term of this patent is extended or adjusted under 35 U.S.C. 154(b) by 475 days.

(21) Appl. No.: 17/432,207

(22) PCT Filed: Feb. 18, 2020

(86) PCT No.: PCT/EP2020/054169
§ 371 (c)(1),
(2) Date: Aug. 19, 2021

(87) PCT Pub. No.: WO2020/169561
PCT Pub. Date: Aug. 27, 2020

(65) Prior Publication Data
US 2022/0187449 A1    Jun. 16, 2022

(30) Foreign Application Priority Data
Feb. 20, 2019 (EP) .................................... 19158200

(51) Int. Cl.
*G01S 13/931* (2020.01)
*G01S 13/58* (2006.01)
*G01S 13/62* (2006.01)

(52) U.S. Cl.
CPC .......... *G01S 13/931* (2013.01); *G01S 13/584* (2013.01); *G01S 13/62* (2013.01); *G01S 2013/93271* (2020.01)

(58) Field of Classification Search
CPC ...... G01S 13/931; G01S 13/584; G01S 13/62; G01S 2013/93271; G01S 13/52;
(Continued)

(56) References Cited

U.S. PATENT DOCUMENTS 7,474,253 B2   1/2009 Natsume
8,527,172 B2 * 9/2013 Moshchuk ............. G08G 1/166
                                                                701/70
(Continued)

FOREIGN PATENT DOCUMENTS

WO    2015/097511 A1    7/2015

OTHER PUBLICATIONS

European Search Report—19158200—Search Authority—Munich—Sep. 10, 2019.
(Continued)

Primary Examiner — Vladimir Magloire
Assistant Examiner — Yonghong Li
(74) Attorney, Agent, or Firm — Qualcomm Auto Ltd.

(57) ABSTRACT

A vehicle environment detection system (3) including a control unit arrangement (8) and at least one sensor arrangement (4) that is arranged to be mounted in an ego vehicle (1) and to provide sensor detections (9, 12) for at least two preceding target vehicles (10, 11). The control unit arrangement (8) is arranged to determine a resulting TTC, time to collision, between the ego vehicle (1) and a closest preceding target vehicle (10), based on an ego velocity ($v_0$) and an ego acceleration ($a_0$) for the ego vehicle (1), a first distance ($r_1$) between the ego vehicle (1) and the closest preceding target vehicle (10), and that target velocity ($v_1$, $v_2$) and corresponding target acceleration ($a_1$, $a_2$) for a preceding target vehicle (10, 11) among the target vehicles (10, 11) that provide a lowest TTC value.

9 Claims, 3 Drawing Sheets

(58) Field of Classification Search
CPC .................. G01S 13/726; G01S 7/415; G01S 2013/93185; G01S 2013/932; G01S 2013/9325; B60W 30/16; B60W 50/14; B60W 2520/10; B60W 2520/105; B60W 2554/802; B60W 2754/30
See application file for complete search history.

(56) References Cited

U.S. PATENT DOCUMENTS

| | | | |
|---|---|---|---|
| 9,501,935 B2 * | 11/2016 | Kastner | B60W 30/09 |
| 9,633,565 B2 * | 4/2017 | Conrad | B60W 50/14 |
| 10,266,176 B2 * | 4/2019 | Nishimura | G08G 1/16 |
| 11,214,267 B2 * | 1/2022 | Ike | B60W 50/14 |
| 2006/0284760 A1 | 12/2006 | Natsume | |
| 2009/0177359 A1 * | 7/2009 | Ihara | B60R 21/0134 |
| | | | 701/45 |
| 2014/0136044 A1 | 5/2014 | Conrad | |
| 2015/0025784 A1 | 1/2015 | Kastner et al. | |

OTHER PUBLICATIONS

International Search Report and Written Opinion of PCT/EP2020/054169, mailed Apr. 28, 2020.

* cited by examiner

VEHICLE RADAR SYSTEM FOR DETECTING PRECEDING OBJECTS

CROSS-REFERENCE TO RELATED APPLICATIONS

This application is a 35 U.S.C. § 371 national phase of PCT International Application No. PCT/EP2020/054169, filed Feb. 18, 2020, which claims the benefit of priority under 35 U.S.C. § 119 to European Patent Application No. 19158200.6, filed Feb. 20, 2019, the contents of which are incorporated herein by reference in their entirety.

FIELD OF THE INVENTION

The present disclosure relates to a vehicle environment detection system having a control unit arrangement and at least one sensor arrangement that is arranged to be mounted in an ego vehicle and to provide sensor detections for at least two preceding target vehicles.

BACKGROUND

Many vehicles include radar systems which are arranged for object detection, being able to provide a warning to a driver about an object in the path of a vehicle, as well as providing input to vehicle systems such as Adaptive Cruise Control (ACC) and Rear Cross Traffic Avoidance (RCTA) systems. These systems can provide both warnings and activate Autonomous Emergency Braking (AEB) to avoid a collision with an object behind a host vehicle.

Such radar systems include one or more forward-looking radar transceivers and one or more rearward-looking radar transceivers in an ego vehicle.

An ego vehicle can crash into a preceding vehicle if the preceding vehicle makes an unexpected deceleration or stop and/or if the driver of the ego vehicle fails to maintain a safe headway distance to the preceding vehicle. A vehicle radar can be used to detect the distance to a preceding vehicle and the relative speed between the preceding vehicle and the ego vehicle, and compute the time to collision (TTC) or the time required for the ego vehicle to reach the current position of the preceding vehicle (TTR).

If the TTC falls below a predetermined threshold value, an alarm may be issued to encourage the vehicle operator to reduce the speed. It is then also possible to activate an emergency safety system such as an automated brake of the ego vehicle.

A collision with a preceding vehicle can occur when a preceding vehicle collides with a further preceding vehicle traveling immediately ahead of the preceding vehicle, and the resulting sudden stopping or deceleration of the preceding vehicle can cause the ego vehicle to collide with the preceding vehicle. In such a situation, the preceding vehicle comes to a stop or decelerates so suddenly that it is extremely difficult for the ego vehicle to stop or decelerate quickly enough to avoid the collision with the preceding vehicle.

Even if the preceding vehicle does not collide with the further preceding vehicle, if the further preceding vehicle decelerates suddenly due to a need for a quick braking, the preceding vehicle may also have to brake quickly, which may be surprising to the driver of the ego vehicle. If the driver of the ego vehicle does not maintain a proper distance to the preceding vehicle, a collision can occur.

The document US 2015/0025784 A1 discloses a forward collision warning system in an ego vehicle that can determine time to collision with a preceding vehicle when there is a further preceding vehicle. A radar can detect preceding vehicles such as a first preceding vehicle and a second preceding vehicle immediately preceding the first preceding vehicle.

The document U.S. Pat. No. 7,474,253 B2 discloses retrieving information about a vehicle in front of a preceding vehicle ahead of the ego vehicle, where correctly estimating a behavior of the vehicle in front of the preceding vehicle is used to smoothly control the speed of the ego vehicle.

The object of the present disclosure is to provide a radar system that prevents collisions, in a more reliable way than previously described, in situations where there is a first preceding vehicle and at least a second preceding vehicle, where the a least one second preceding vehicle precedes the first preceding vehicle.

SUMMARY

The above described object is obtained by a vehicle environment detection system including a control unit arrangement and at least one sensor arrangement that is arranged to be mounted in an ego vehicle and to provide sensor detections for at least two preceding target vehicles. The control unit arrangement is arranged to determine a resulting TTC (time to collision) between the ego vehicle and a closest preceding target vehicle, based on an ego velocity and an ego acceleration for the ego vehicle, a first distance between the ego vehicle and the closest preceding target vehicle. The resulting TTC is furthermore based on that target velocity and corresponding target acceleration for a preceding target vehicle among the target vehicles that provide a lowest TTC value.

In this way, in situations where there is a first preceding vehicle and at least a second preceding vehicle, where the at least one second preceding vehicle precedes the first preceding vehicle, collisions can be prevented in a reliable way.

According to some aspects of the present disclosure, the vehicle environment detection system is adapted to determine vehicle data regarding an ego velocity and an ego acceleration for the ego vehicle. By use of the sensor detections, the vehicle environment detection system is adapted to determine further vehicle data including the first distance and a corresponding distance between the ego vehicle and each further preceding target vehicle, and corresponding target velocity and target acceleration for each preceding target vehicle.

According to some aspects of the present disclosure, the control unit arrangement is adapted to determine a corresponding initial TTC between the ego vehicle and each one of the preceding target vehicles. The control unit arrangement is further adapted to compare the determined initial TTC:s with a TTC threshold, and to only consider preceding vehicles that are associated with a corresponding initial TTC that falls below the TTC threshold when determining the resulting TTC.

In this way, situations that do not pose an imminent danger can be identified.

According to some aspects of the present disclosure, the control unit arrangement is arranged to compare each initial TTC value that falls below the TTC threshold with a first initial threshold value and to initiate an alarm if any of these initial TTC values falls below the first initial threshold value.

In this way, irrelevant and false alarms can be avoided.

According to some aspects of the present disclosure, the control unit arrangement is arranged to compare each initial TTC value that falls below the TTC threshold with a second initial threshold value, falling below the first initial threshold value, and to initiate an emergency safety system if any of these initial TTC values falls below the second initial threshold value.

In this way, unnecessary initiations of emergency safety systems can be avoided.

According to some aspects of the present disclosure, the control unit arrangement is arranged to compare the resulting TTC with a first threshold value and to initiate an alarm if the resulting TTC falls below the first threshold value.

In this way, a collision situation can be prevented.

According to some aspects of the present disclosure, the control unit arrangement is arranged to compare the resulting TTC with a second threshold value, falling below the first threshold value, and to initiate an emergency safety system if the resulting TTC falls below the second threshold value.

In this way, a collision situation can be prevented or mitigated.

According to some aspects of the present disclosure, for each pair of any two preceding vehicles that travel successively one after the other among the at least two preceding vehicles, the control unit arrangement is arranged to determine a corresponding further TTC between the vehicles in each such pair, where the control unit arrangement is arranged to compare at least one further TTC from the determined further TTC:s with at least one further threshold value, and to adjust at least one of the first threshold value and second threshold value accordingly.

In this way an even more reliable collision prevention can be obtained.

There are also disclosed herein methods associated with the above-mentioned advantages.

BRIEF DESCRIPTION OF THE DRAWINGS

The present disclosure will now be described more in detail with reference to the appended drawings, where.

DETAILED DESCRIPTION

Figure 1:
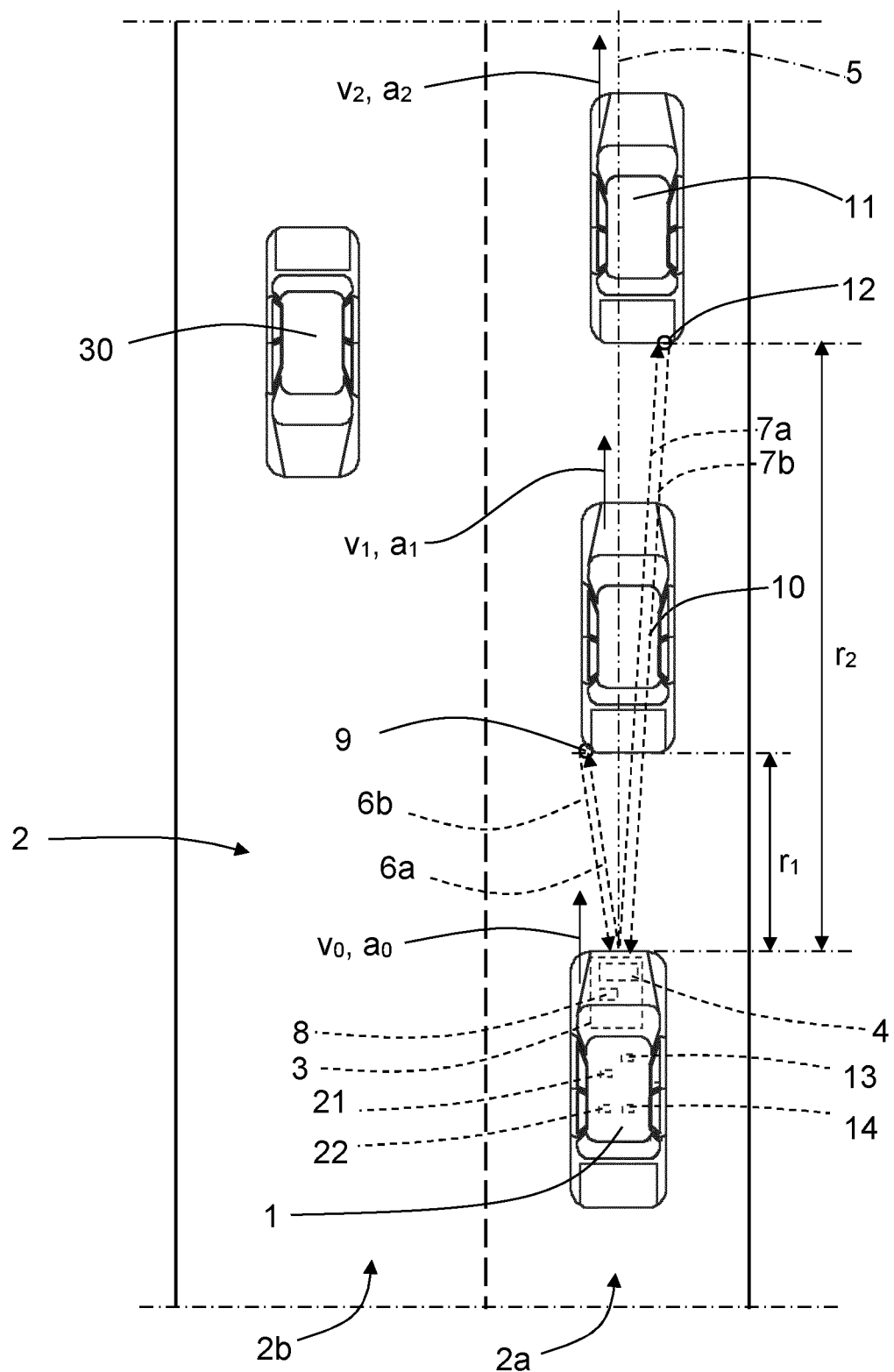
FIG. 1 shows a schematic top view of an ego vehicle.

FIG. 1 schematically shows a top view of an ego vehicle 1 arranged to run in a first lane 2a on a road 2, where the ego vehicle 1 includes a vehicle radar system 3. The vehicle radar system 3 includes a radar sensor arrangement 4 that is arranged to distinguish and/or resolve targets from the surroundings by transmitting signal 6a, 7a and receiving corresponding reflected signals 6b, 7b and using a Doppler effect in a previously well-known manner. The signals 6a, 6b; 7a, 7b are according to some embodiments constituted by sweep signals in the form of FMCW (Frequency Modulated Continuous Wave) chirp signals 6 of a previously known kind.

In front of the ego vehicle 1 there is a first preceding target vehicle 10, and in front of the first preceding target vehicle 10 there is a second preceding target vehicle 11, thus preceding the first preceding target vehicle 10.

The vehicle radar system 3 further includes a control unit arrangement 8 that is connected to the radar sensor arrangement 4 and is arranged to provide azimuth angles, distance and radial velocity of possible target object detections by simultaneously sampling and analyzing phase and amplitude of the received signals in a previously well-known manner. Azimuth angles are determined relative a radar reference line 5 that for example is constituted by a radar sensor arrangement boresight direction.

The control unit arrangement 8 is also arranged to determine vehicle data regarding the own vehicle's, the ego vehicle's, ego velocity $v_0$ and ego acceleration $a_0$. The control unit arrangement 8 is adapted to acquire these ego vehicle data from suitable sources, such as a speedometer arrangement 21 and an accelerometer arrangement 22 of the ego vehicle 1 in a previously well-known manner.

In FIG. 1, a first radar detection 9 of the first preceding target vehicle 10 and a second radar detection 12 of the second preceding target vehicle 11 are shown. The second radar detection 12 is acquired by having corresponding transmitted signals 7a and received reflected signals 7b bounced beneath the first preceding target vehicle 10. According to some embodiments, the sensor radar sensor arrangement 4 can be tilted vertically to achieve this, but it is also sufficient to have a radar sensor with a sufficient field of view in elevation direction.

According to some embodiments, the second radar detection is acquired by having corresponding transmitted signals and received reflected signals reflected at guardrails or other structures along the road 2.

For reasons of clarity, only one radar detection 9, 12 is shown for each target vehicle 10, 11; of course, there can be a multitude of radar detections for each target vehicle 10, 11.

By use of the radar detections 9, 12, the vehicle radar system 3 is arranged perform tracking of the preceding vehicles 10, 11 in a well-known manner, and to determine further vehicle data regarding:

a first distance $r_1$ between the ego vehicle 1 and the first preceding target vehicle 10;

a first target velocity $v_1$ and a first target acceleration $a_1$ for the first preceding target vehicle 10;

a second distance $r_2$ between the ego vehicle 1 and the second preceding target vehicle 11; and a second target velocity $v_2$ and a second target acceleration $a_2$ for the second preceding target vehicle 11.

The control unit arrangement 8 is arranged to determine the first target acceleration $a_1$ for the first preceding target vehicle 10 and the second target acceleration $a_2$ for the second preceding target vehicle 11.

According to the present disclosure, the control unit arrangement 8 is arranged to determine a resulting TTC (time to collision) between the ego vehicle 1 and the first preceding target vehicle 10, based on the ego velocity $v_0$, the ego acceleration $a_0$, the first distance $r_1$, and those of the target velocity $v_1$, $v_2$ and corresponding target acceleration $a_1$, $a_2$ that provides the lowest value for the resulting TTC.

According to some embodiments, the control unit arrangement 8 is arranged to compare the determined TTC values with a first threshold value and to initiate an alarm if any TTC falls below the first threshold value. Such an alarm is intended to encourage the driver of the ego vehicle 1 to react in any suitable way, for example by appropriate steering and/or speed reduction.

According to some embodiments, the control unit arrangement 8 is arranged to compare the determined TTC values with a second threshold value, falling below the first threshold value. If any TTC falls below the second threshold value, the control unit arrangement 8 is arranged to initiate an emergency safety system such as an automated brake of the ego vehicle 1.

For this purpose, as indicated in FIG. 1, the ego vehicle 1 includes a safety control unit 13 and safety system 14, for example in the form of an emergency braking system, seatbelt pre-tensioners and an alarm signal device. The safety control unit 13 is arranged to control the safety system 14 in dependence of input from the radar system 3. Such input may be conferred via the control unit arrangement 8.

According to some embodiments, the control unit arrangement 8 is arranged to determine a corresponding initial TTC between the ego vehicle 1 and each one of the preceding vehicles 10, 11, and to use the determined initial TTC:s for discarding preceding vehicles that are relatively far away when determining the resulting TTC.

For this purpose, the control unit arrangement 8 is arranged to compare the determined initial TTC:s with a TTC threshold, and only preceding vehicles that are associated with a corresponding initial TTC that falls below the TTC threshold are considered when determining the resulting TTC.

According to some embodiments, the control unit arrangement 8 is arranged to compare the determined initial TTC values that fall below the TTC threshold with a first initial threshold value and to initiate an alarm if any of these initial TTC values falls below the initial first threshold value. Such an alarm is intended to encourage the driver of the ego vehicle 1 to react in any suitable way, for example by appropriate steering and/or speed reduction.

According to some embodiments, the control unit arrangement 8 is arranged to compare the determined initial TTC values that fall below the TTC threshold with a second initial threshold value, falling below the first initial threshold value. If any of these initial TTC values falls below the second initial threshold value, the control unit arrangement 8 is arranged to initiate an emergency safety system such as an automated brake of the ego vehicle 1.

According to some embodiments, the first initial threshold value equals the first threshold value and the second initial threshold value equals the second threshold value.

According to some embodiments, the resulting TTC is determined irrespective of if any determined initial TTC value that falls below the TTC threshold also falls below any threshold value according to the above.

According to some embodiments, the resulting TTC is not determined if any determined initial TTC value that falls below the TTC threshold also falls below any threshold value according to the above.

In this example, the control unit arrangement 8 is arranged to determine a first initial TTC between the ego vehicle 1 and the first preceding target vehicle 10 based on the ego velocity $v_0$, the ego acceleration $a_0$, the first distance $r_1$, the first target velocity $v_1$ and the first target acceleration $a_1$. The control unit arrangement 8 is also arranged to determine a second initial TTC between the ego vehicle 1 and the second preceding target vehicle 11 based on the ego velocity $v_0$, the ego acceleration $a_0$, the second distance $r_2$ the second target velocity $v_2$ and the second target acceleration $a_2$.

As an illustrating example of the above, if the second preceding vehicle 11 suddenly brakes and this results in a resulting TTC that falls below the first threshold value or below both the first threshold value and the second threshold value, an alarm or an emergency safety system should be initiated according to the above.

However, according to some embodiments, if the second preceding vehicle 11 is relatively far away such that the second initial TTC exceeds the TTC threshold, the second preceding vehicle 11 is not considered when the resulting TTC is determined The sudden braking of the second preceding vehicle 11 will consequently not affect the resulting TTC and not initiate any alarm or emergency safety system. A braking preceding vehicle that is relatively far away from the ego vehicle 1 does thus not have any impact on possible safety measures at the ego vehicle 1.

The control unit arrangement 8 is arranged to compare the resulting TTC value with at least one threshold value and to initiate a proper action if any TTC falls below said the threshold value.

The present disclosure is also applicable for more than two preceding vehicles, but there are always at least two preceding vehicles 10, 11.

Generally, for two or more preceding vehicles, for each pair of any two preceding vehicles that travel successively one after the other among the at least two preceding vehicles, the control unit arrangement 8 is arranged to determine a further TTC between the vehicles in each such pair. The control unit arrangement 8 is arranged to compare at least one further TTC from the determined further TTC:s with at least one further threshold value, and to adjust at least one of the first threshold value and second threshold value accordingly.

This means that if two preceding vehicles have a relatively low mutual further TTC, at least one of the first threshold value and second threshold value can be temporarily increased, since the risk for collision between these preceding vehicles has increased.

In order to avoid taking a target vehicle 30 in a second lane 2b into account in the above determining of TTC, a path prediction based on the driving state of the ego vehicle 1 is performed. Alternatively, a lane detection based on a vision system could be used, or a combination of both. This is independent of in which direction such a target vehicle 30 is travelling.

Figure 2:
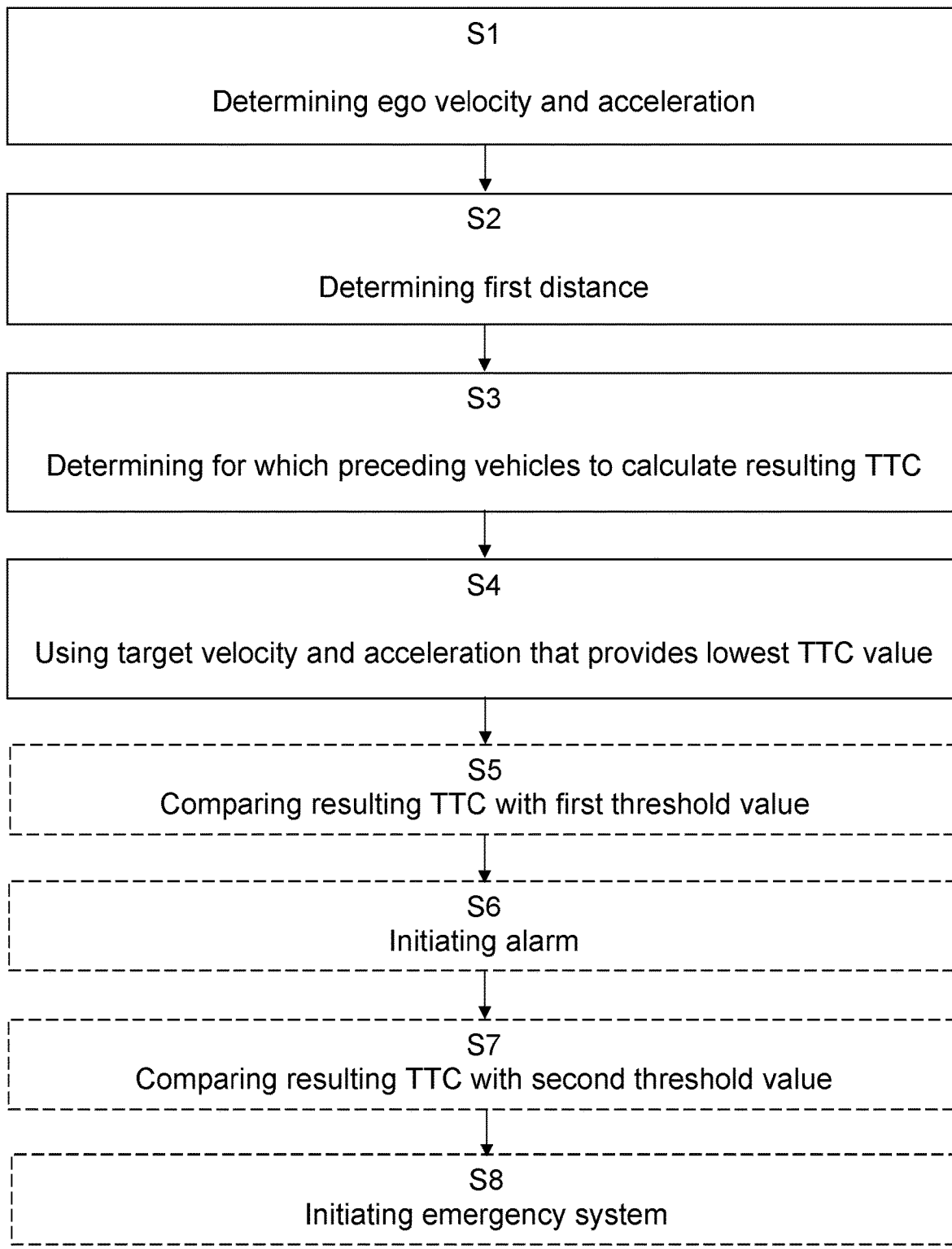
FIGS. 2 and 3 show flowcharts for methods according to the present disclosure.

With reference to FIG. 2, the present disclosure also relates to a method for determining TTC, time to collision, between an ego vehicle 1 and a closest preceding target vehicle 10, where there are at least two preceding target vehicles 10, 11, the method including the following steps of:

determining in step S1 an ego velocity $v_0$ and an ego acceleration $a_0$ for the ego vehicle 1;

determining in step S2 a first distance $r_1$ between the ego vehicle 1 and the closest preceding target vehicle 10; and determining in step S3 for which preceding vehicles a resulting TTC shall be calculated;

for each one of the preceding vehicles for which the resulting TTC shall be calculated, the method further includes the steps of:

determining in step S4 target velocity $v_1$, $v_2$ and corresponding target acceleration $a_1$, $a_2$; and using in step S4 that target velocity $v_1$, $v_2$ and corresponding target acceleration $a_1$, $a_2$ for a preceding target vehicle 10, 11, among the target vehicles 10, 11, that provide the lowest TTC value.

Figure 3:
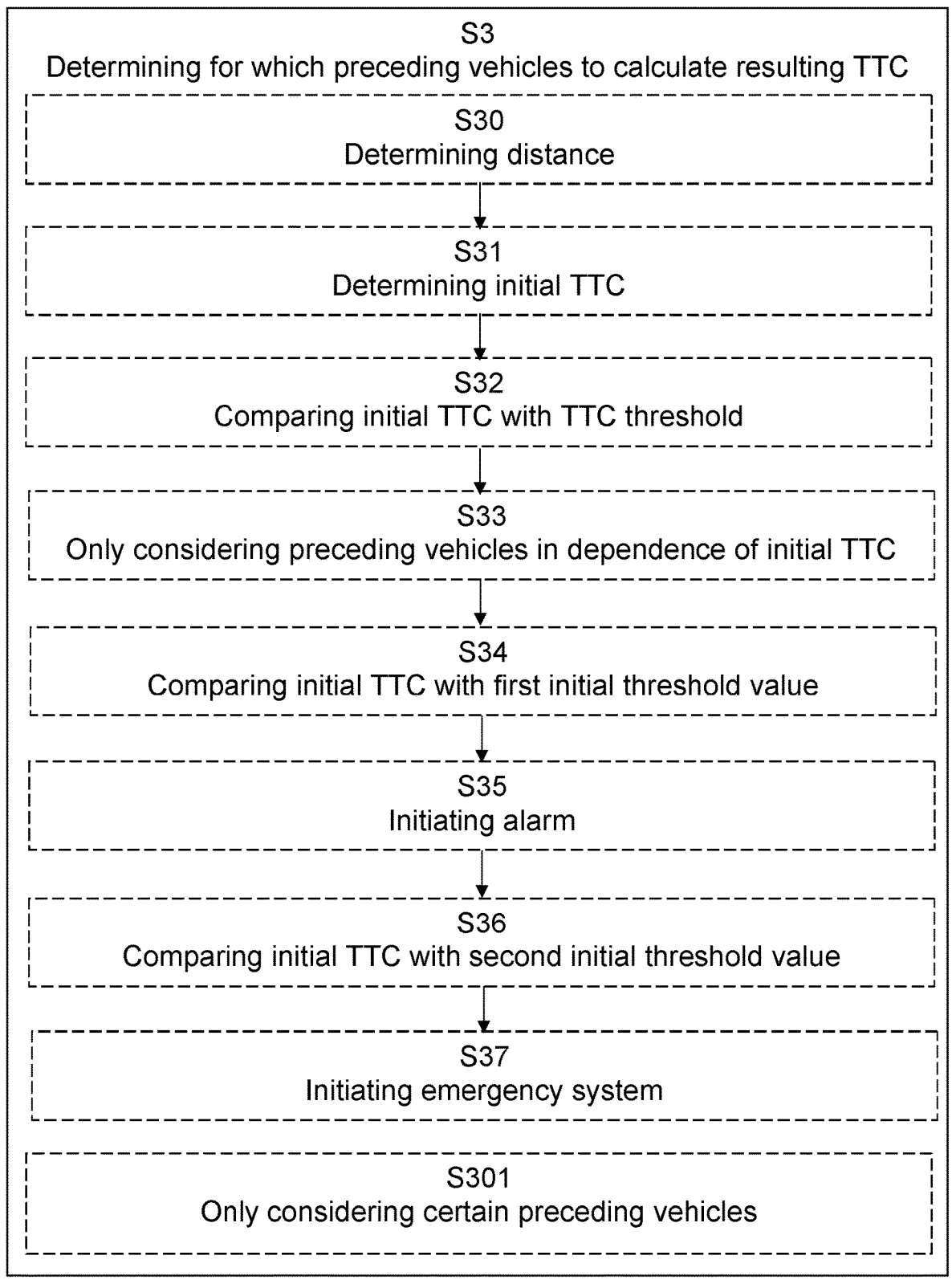

With reference also to FIG. 3, according to some embodiments, the determining step S3 for which preceding vehicles a resulting TTC shall be calculated by:

determining in step S30 a corresponding distance $r_2$ between the ego vehicle 1 and each further preceding target vehicle 11;

determining in step S31 an initial TTC between the ego vehicle 1 and each one of the preceding target vehicles 10, 11;

comparing in step S32 the determined initial TTC:s with a TTC threshold; and only considering in step S33 preceding vehicles that are associated with a corresponding initial TTC that falls below the TTC threshold when determining the resulting TTC.

According to some embodiments, the determining step S3 for which preceding vehicles a resulting TTC shall be calculated includes the steps of:
comparing in step S34 each initial TTC value that falls below the TTC threshold with a first initial threshold value; and
initiating in step S35 an alarm if any of these initial TTC values falls below the first initial threshold value.

According to some embodiments, the determining S3 for which preceding vehicles a resulting TTC shall be calculated includes the steps of:
comparing in step S36 each initial TTC value that falls below the TTC threshold with a second initial threshold value, falling below the first initial threshold value;
and initiating in step S37 an emergency safety system if any of these initial TTC values falls below the second initial threshold value.

According to some-embodiments, the determining step S3 for which preceding vehicles a resulting TTC shall be calculated includes the step of:
only considering in step S301 preceding vehicles that are associated with a corresponding initial TTC that falls below the TTC threshold and exceeds all threshold values when determining the resulting TTC.

According to some embodiments, the method further includes the steps of:
comparing in step S5 the resulting TTC with a first threshold value; and
initiating in step S6 an alarm if the resulting TTC falls below the first threshold value.

According to some embodiments, the method further includes the steps of:
comparing in step S7 the resulting TTC with a second threshold value, falling below the first threshold value; and
initiating in step S8 an emergency safety system if the resulting TTC falls below the second threshold value.

The present disclosure is not limited to the examples above but may vary freely within the scope of the appended claims. For example, the radar system may be implemented in any type of vehicle such as cars, trucks and buses as well as boats and aircraft.

Exactly how data processing, such as calculations and determining procedures, is accomplished in practice may vary, the example disclosed above is only an example. The control unit arrangement 8 may be provided by one or more separate or integrated control units. The safety control unit 13 is according to some embodiments included in the control unit arrangement 8.

In the examples discussed there is a tracked target vehicle; generally, there can be any type of tracked target object such as for example a bicycle or a pedestrian.

Other kinds of FMCW signals and FMCW signal configurations are also conceivable, as well as other types of Doppler radar signals. Other types of radar systems are also conceivable; not only FMCW radar systems are conceivable. Pulse radar, FSK (frequency-shift keying) or CW (continuous wave) waveform are also conceivable like all other kinds of suitable modulation techniques.

The present disclosure does not only relate to vehicle radar systems but generally relates to any type of vehicle environment detection system such as ultrasonic or Lidar.

Generally, the present disclosure relates to a vehicle environment detection system 3 including a control unit arrangement 8 and at least one sensor arrangement 4 that is arranged to be mounted in an ego vehicle 1 and to provide sensor detections 9, 12 for at least two preceding target vehicles 10, 11. The control unit arrangement 8 is arranged to determine a resulting TTC (time to collision) between the ego vehicle 1 and a closest preceding target vehicle 10, based on an ego velocity $v_0$ and an ego acceleration $a_0$ for the ego vehicle 1, a first distance $r_1$ between the ego vehicle 1 and the closest preceding target vehicle 10, and that target velocity $v_1$, $v_2$ and corresponding target acceleration $a_1$, $a_2$ for a preceding target vehicle 10, 11 among the target vehicles 10, 11 that provide a lowest TTC value.

According to some embodiments, the vehicle environment detection system 3 is adapted to determine vehicle data regarding an ego velocity $v_0$ and an ego acceleration $a_0$ for the ego vehicle 1, and, by means of the sensor detections 9, 12, to determine further vehicle data including the first distance $r_1$ and a corresponding distance $r_2$ between the ego vehicle 1 and each further preceding target vehicle 11, and corresponding target velocity $v_1$, $v_2$ and target acceleration $a_1$, $a_2$ for each preceding target vehicle 10, 11.

According to some embodiments, the control unit arrangement 8 is adapted to determine a corresponding initial TTC between the ego vehicle 1 and each one of the preceding target vehicles 10, 11, and to compare the determined initial TTC:s with a TTC threshold, and to only consider preceding vehicles that are associated with a corresponding initial TTC that falls below the TTC threshold when determining the resulting TTC.

According to some embodiments, the control unit arrangement 8 is arranged to compare each initial TTC value that falls below the TTC threshold with a first initial threshold value and to initiate an alarm if any of these initial TTC values falls below the first initial threshold value.

According to some embodiments, the control unit arrangement 8 is arranged to compare each initial TTC value that falls below the TTC threshold with a second initial threshold value, falling below the first initial threshold value, and to initiate an emergency safety system if any of these initial TTC values falls below the second initial threshold value.

According to some embodiments, the control unit arrangement 8 is arranged to compare the resulting TTC with a first threshold value and to initiate an alarm if the resulting TTC falls below the first threshold value.

According to some embodiments, the control unit arrangement 8 is arranged to compare the resulting TTC with a second threshold value, falling below the first threshold value, and to initiate an emergency safety system if the resulting TTC falls below the second threshold value.

According to some embodiments, for each pair of any two preceding vehicles that travel successively one after the other among the at least two preceding vehicles, the control unit arrangement 8 is arranged to determine a corresponding further TTC between the vehicles in each such pair, where the control unit arrangement 8 is arranged to compare at least one further TTC from the determined further TTC:s with at least one further threshold value, and to adjust at least one of the first threshold value and second threshold value accordingly.

While the above description constitutes the preferred embodiment of the present invention, it will be appreciated that the invention is susceptible to modification, variation and change without departing from the proper scope and fair meaning of the accompanying claims.

The invention claimed is:
1. A vehicle environment detection system that is arranged to be mounted in an ego vehicle comprising:
a control unit arrangement; and at least one sensor arrangement to provide sensor detection for a plurality of preceding target vehicles,
wherein the control unit arrangement is arranged to:
  determine an ego vehicle velocity and an ego vehicle acceleration for the ego vehicle;
  determine a first distance between the ego vehicle and a closest preceding target vehicle of the plurality of preceding target vehicles;
  determine one or more of the plurality of preceding target vehicles to be considered in determining a resulting time to collision, comprising, for each corresponding preceding target vehicle of the plurality of preceding target vehicles;
  determine a second distance between the ego vehicle and the corresponding preceding target vehicle;
  determine an initial time to collision value between the ego vehicle and the corresponding preceding target vehicle using a target velocity and a target acceleration for the corresponding preceding target vehicle;
  compare the initial time to collision value for the corresponding preceding target vehicle with a time to collision threshold;
  in response to determining that the initial time to collision value for the corresponding preceding target vehicle is below the time to collision threshold, compare the initial time to collision value for the corresponding preceding target vehicle with at least one initial threshold value, wherein the at least one initial threshold value is below the time to collision threshold;
  determine that the corresponding preceding target vehicle is not to be considered in determining the resulting time to collision if the initial time to collision value for the corresponding preceding target vehicle is below the at least one initial threshold value; and
  determine that the corresponding preceding target vehicle is to be considered in determining the resulting time to collision if the initial time to collision value for the corresponding preceding target vehicle is below the time to collision threshold and exceeds the at least one initial threshold value;
  determine a given corresponding preceding target vehicle that provides a lowest initial time to collision value, from the one or more of the plurality of preceding target vehicles to be considered in determining the resulting time to collision;
  determine the resulting time to collision between the ego vehicle and the closest preceding target vehicle based on the ego vehicle velocity, the ego vehicle acceleration, the first distance between the ego vehicle and the closest preceding target vehicle, and a target velocity and a target acceleration for the given corresponding preceding target vehicle;
  compare the resulting time to collision with the at least one initial threshold; and
  initiate collision avoidance for the ego vehicle based on the resulting time to collision being below the at least one initial threshold value.

2. The vehicle environment detection system according to claim 1, wherein in the determining of the one or more of the plurality of preceding target vehicles to be considered in determining the resulting time to collision, the control unit arrangement is arranged to:
  not consider the corresponding preceding target vehicle if the initial time to collision value for the corresponding preceding target vehicle exceeds the time to collision threshold.

3. The vehicle environment detection system according to claim 2, wherein the at least one initial threshold value comprises a first initial threshold value, wherein the collision avoidance comprises an alarm, wherein in the comparing of the resulting time to collision with the at least one initial threshold value and in the initiating of the collision avoidance for the ego vehicle, the control unit arrangement is further arranged to:
  compare the resulting time to collision with the first initial threshold value; and
  initiate the alarm if the resulting time to collision falls below the first initial threshold value.

4. The vehicle environment detection system according to claim 3, wherein the at least one initial threshold value comprises a second initial threshold value, wherein the collision avoidance comprises an emergency safety system, wherein in the comparing of the resulting time to collision with the at least one initial threshold value and in the initiating of the collision avoidance for the ego vehicle, the control unit arrangement is further arranged to:
  compare the resulting time to collision with the second initial threshold value, wherein the second initial threshold value falls below the first initial threshold value; and
  initiate the emergency safety system if the resulting time to collision falls below the second initial threshold value.

5. The vehicle environment detection system according to claim 4, wherein the control unit arrangement is further arranged to:
  for each pair of any two preceding target vehicles of the plurality of preceding target vehicles that travel successively one after the other, determine a corresponding further time to collision between the two preceding target vehicles in each pair;
  compare at least one further time to collision value from the determined further time to collision for each pair with a third initial threshold value; and
  adjust at least one of the first initial threshold value and the second initial threshold value based on the comparing of the at least one further time collision value for each pair with the third initial threshold value.

6. A method for determining a time to collision, between an ego vehicle and a closest preceding target vehicle a plurality of preceding target vehicles, the method comprising:
  determining an ego vehicle velocity and a vehicle ego acceleration for the ego vehicle;
  determining a first distance between the ego vehicle and the closest preceding target vehicle of the plurality of preceding target vehicles; and
  determining one or more of the plurality of preceding target vehicles to be considered in determining a resulting time to collision, comprising, for each corresponding preceding target vehicle of the plurality of preceding target vehicles:
    determining a second distance between the ego vehicle and the corresponding preceding target vehicle;
    determining an initial time to collision value between the ego vehicle and the corresponding preceding target vehicle using a target velocity and a target acceleration for the corresponding preceding target vehicle;

comparing the initial time to collision value for the corresponding preceding target vehicle with a time to collision threshold;

in response to determining that the initial time to collision value for the corresponding preceding target vehicle is below the time to collision threshold, comparing the initial time to collision value for the corresponding preceding target vehicle with at least one initial threshold value, wherein the at least one initial threshold value is below the time to collision threshold;

determining that the corresponding preceding target vehicle is not to be considered in determining the resulting time to collision if the initial time to collision value for the corresponding preceding target vehicle is below the at least one initial threshold value; and determining that the corresponding preceding target vehicle is to be considered in determining the resulting time to collision if the initial time to collision value for the corresponding preceding target vehicle is below the time to collision threshold and exceeds the at least one initial threshold value;

determining a given corresponding preceding target vehicle that provides a lowest initial time to collision value, from the one or more of the plurality of preceding target vehicles to be considered in determining the resulting time to collision;

determining the resulting time to collision between the ego vehicle and the closest preceding target vehicle based on the ego vehicle velocity, the ego vehicle acceleration, the first distance between the ego vehicle and the closest preceding target vehicle, and a target velocity and a target acceleration for the given corresponding preceding target vehicle;

comparing the resulting time to collision with the at least one initial threshold; and initiating collision avoidance for the ego vehicle based on the resulting time to collision being below the at least one initial threshold value.

7. The method according to claim 6, wherein the determining of the one or more of the plurality of preceding target vehicles to be considered in determining the resulting time to collision, comprises:

not considering the corresponding preceding target vehicle if the initial time to collision value for the corresponding preceding target vehicle exceeds the time to collision threshold.

8. The method according to claim 7, wherein the at least one initial threshold value comprises a first initial threshold value, wherein the collision avoidance comprises an alarm, wherein the comparing of the resulting time to collision with the at least one initial threshold value further comprises:

comparing the resulting time to collision with the first initial threshold value; and initiating the alarm if the resulting time to collision falls below the first initial threshold value.

9. The method according to claim 8, wherein the at least one initial threshold value comprises a second initial threshold value, wherein the collision avoidance comprises an emergency safety system, wherein the comparing of the resulting time to collision with the at least one initial threshold value further comprises:

comparing the resulting time to collision with the second initial threshold value, wherein the second initial threshold value falls below the first initial threshold value; and initiating the emergency safety system if the resulting time to collision falls below the second initial threshold value.

* * * * *